US010165500B2

(12) United States Patent
Zhu et al.

(10) Patent No.: US 10,165,500 B2
(45) Date of Patent: Dec. 25, 2018

(54) NETWORK SEARCH METHOD, NETWORK SEARCH DEVICE AND TERMINAL

(71) Applicant: YULONG COMPUTER TELECOMMUNICATION SCIENTIFIC (SHENZHEN) CO., LTD., Shenzhen (CN)

(72) Inventors: Fang-Hao Zhu, Shenzhen (CN); Wei-Qing Li, Shenzhen (CN); Yu-Sheng Huang, Shenzhen (CN); Yi-Wei Ma, Shenzhen (CN); Hu-Song Li, Shenzhen (CN); Mao-Qing Luo, Shenzhen (CN)

(73) Assignee: YULONG COMPUTER TELECOMMUNICATION SCIENTIFIC (SHENZHEN) CO., LTD., Shenzhen (CN)

( * ) Notice: Subject to any disclaimer, the term of this patent is extended or adjusted under 35 U.S.C. 154(b) by 127 days.

(21) Appl. No.: 15/289,977

(22) Filed: Oct. 11, 2016

(65) Prior Publication Data
US 2017/0034771 A1 Feb. 2, 2017

Related U.S. Application Data

(63) Continuation-in-part of application No. PCT/CN2014/075431, filed on Apr. 15, 2014.

(51) Int. Cl.
*H04W 48/14* (2009.01)
*H04W 76/30* (2018.01)
(Continued)

(52) U.S. Cl.
CPC .......... *H04W 48/14* (2013.01); *H04W 36/08* (2013.01); *H04W 36/30* (2013.01);
(Continued)

(58) Field of Classification Search
CPC . H04W 48/14; H04W 76/30; H04W 52/0225; H04W 76/06; H04W 36/30;
(Continued)

(56) References Cited

U.S. PATENT DOCUMENTS

2008/0102784 A1* 5/2008 Mittal .................... H04M 11/04
455/404.1
2011/0051692 A1* 3/2011 Sambhwani ...... H04W 36/0072
370/332
(Continued)

FOREIGN PATENT DOCUMENTS

WO 2009/009702 A1 1/2009
WO 2013/159334 A1 10/2013

*Primary Examiner* — Thai Nguyen
(74) *Attorney, Agent, or Firm* — ScienBiziP, P.C.

(57) ABSTRACT

A network search method is provided. The network search method includes: keeping a terminal residing in a second network when the terminal is disconnected from a first network or has not registered to the first network; and performing a search operation for the first network by the terminal, when a serving cell and/or an adjacent cell corresponding to the terminal in the second network change. A network search device and a terminal are also provided. By utilizing the network search method, the network search device and the terminal, according to location change of the terminal, not only the network search frequency or search times for the first network can be reduced, to avoid a blind network search which may result in wasting power consumption of the terminal, but also the terminal can be connected to a specific network as soon as possible, and user experience is improved.

20 Claims, 14 Drawing Sheets

(51) Int. Cl.
*H04W 36/08* (2009.01)
*H04W 36/30* (2009.01)
*H04W 52/02* (2009.01)
H04W 84/04 (2009.01)
H04W 88/06 (2009.01)

(52) U.S. Cl.
CPC ....... *H04W 52/0225* (2013.01); *H04W 76/30* (2018.02); *H04W 84/042* (2013.01); *H04W 88/06* (2013.01); *Y02D 70/124* (2018.01); *Y02D 70/1222* (2018.01); *Y02D 70/1224* (2018.01); *Y02D 70/1262* (2018.01); *Y02D 70/164* (2018.01); *Y02D 70/23* (2018.01)

(58) Field of Classification Search
CPC ... H04W 36/08; H04W 88/06; H04W 84/042; Y02D 70/00; Y02D 70/23; Y02D 70/1224; Y02D 70/1222; Y02D 70/164; Y02D 70/1262
See application file for complete search history.

(56) References Cited

U.S. PATENT DOCUMENTS

2013/0035093 A1 2/2013 Doyle
2015/0094067 A1* 4/2015 Hole ................ H04W 36/0088
455/436

* cited by examiner

NETWORK SEARCH METHOD, NETWORK SEARCH DEVICE AND TERMINAL

CROSS-REFERENCE TO RELATED APPLICATIONS

This application is a continuation-in-part of International Application No. PCT/CN2014/075431, filed on Apr. 15, 2014.

FIELD

The embodiments of the present disclosure relate to wireless communication technology, and specifically to a network search method, a network search device, and a terminal.

BACKGROUND

As communication technology has developed into fourth generation of wireless mobile telecommunications technology (4G), its entire network architecture has changed compared with second-generation wireless telephone technology (2G)/third generation (3G). Voice service is the most basic and the most important demand of wireless communication, it brings a big trouble to network operators or terminal operators to realize the voice service in 4G. A plurality of chip manufacturers and 3rd Generation Partnership Project (3GPP) organization propose different solutions for operators, including single card dual standby program of Simultaneous GSM and Long Term Evolution (SGLTE)/simultaneous voice and LTE (SVLTE), circuit domain down programs of circuit-switched fallback (CSFB), and Single Radio Voice Call Continuity (SRVCC)/voice over LTE (VoLTE). In these solutions, a single card dual standby program of SVLTE has no special requirements on the network, makes small changes to the network side, and does not require deployment of IP Multimedia Subsystem (IMS). SVLTE is thus being considered by the network operators.

Network construction of 4G is in an early stage, and 4G network coverage cannot be seamless. Even if operators adopt regional coverage in some cities and regions for reasons of cost, there are still disconnection problems with the 4G network for mobile terminals.

As shown in FIG. 1, it is assumed that, in FIG. 1 (*a*), a user equipment (UE) in the 3G and 4G network is on signal standby or dual standby for the 4G network. When the UE leaves 4G network coverage region, the UE may be disconnected from the 4G network and the UE may then be connected to the 2G network and 3G network as shown in FIG. 1 (*b*). The UE also may be connected to the 2G network as shown in FIG. 1 (*c*) if the UE leaves the 4G network coverage region. When the UE returns to the 4G network coverage region as shown in FIG. 1 (*d*), a user of the UE would prefer a rapid connection to the 4G network, but in view of power consumption of the UE, the UE cannot keep trying to find and access the 4G network.

Therefore, preventing a waste of power consumption of the UE caused by frequent and blind network searching, and making the UE be able to access a specific network (e.g., the 4G network) as quickly as possible are problematic.

DETAILED DESCRIPTION

For clarity of illustration of objectives, features and advantages of the present disclosure, where appropriate, the above drawings combined with detailed description illustrate the embodiments of the present disclosure hereinafter. It must be appreciated that different embodiments and elements in the different embodiment of the present disclosure can be combined, when there is no conflict.

The embodiments described herein are for better understanding of the present disclosure, other embodiments can also be practiced. The description is not to be considered as limiting the scope of the embodiments described herein.

Figure 1:
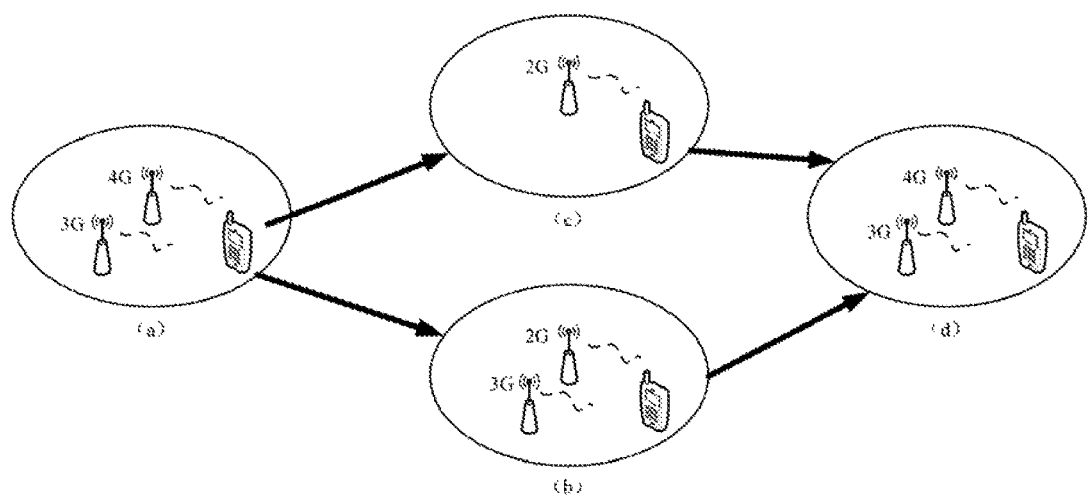
FIG. 1 illustrates one embodiment of a network disconnection and network re-searching procedure of a user equipment (UE) in related arts.
Figure 2:
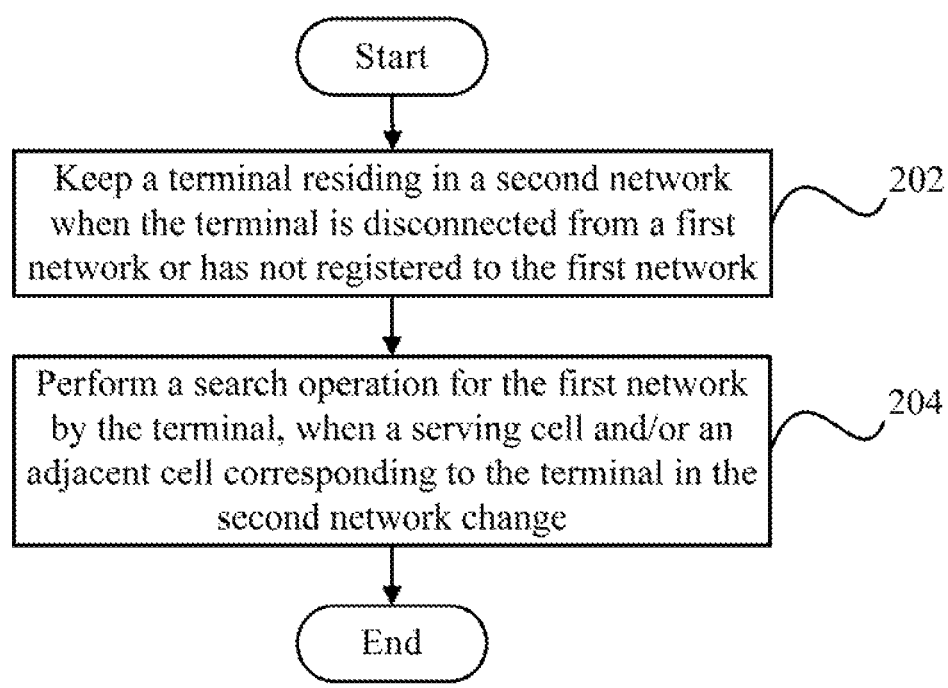
FIG. 2 shows a schematic flowchart of one embodiment of a network search method according to the present disclosure.

FIG. 2 shows a schematic flowchart of one embodiment of a network search method according to the present disclosure.

As shown in FIG. 2, according to one embodiment of the present disclosure, the network search method includes:

Step 202, the terminal is disconnected from a first network or has not registered to the first network, then the terminal is residing in a second network;

Step 204, when a serving cell and/or an adjacent cell corresponding to the terminal in the second network change, the terminal performs a search operation for the first network.

In the above embodiment, for a multi-mode terminal, when the terminal is disconnected from the first network, continuity of communication can be ensured by keeping the terminal residing in the second network. In the second network, as the terminal must be connected to the adjacent cell, thus location changes of the terminal in the second network can be reflected directly by acquiring changes of the serving cell and/or the adjacent cell to which the terminal is connected in the second network. Namely, changes of the serving cell and/or the adjacent cell must be caused by location change of the terminal, and a location of the terminal may change dramatically. In addition, in other embodiments, when the terminal is powered on in a region which is not covered by the first network, the present disclosure can make the terminal register to the second network first, and ensure that the terminal searches for the first network quickly according to the above search operation based on the location change. At the same time, a blind network search can be avoided, and the power consumption of the terminal can be reduced.

Accordingly, based on the location change of the terminal, the terminal may enter/re-enter into a coverage area of the first network. By performing the search operation for the first network at this moment, a success rate for the search operation is increased, increase of power consumption of the terminal caused by the blind network search can be avoided, and standby time of the terminal can be extended.

In the above embodiment, the first network and the second network can be any two different wireless communication networks, for example, to base stations having same positions, the coverage area of the first network may be smaller than a coverage area of the second network. In some embodiments, the first network may be the 4G network (e.g., Long Term Evolution (LTE)), and the second network may be 2G network (e.g., GSM, GPRS, EDGE CDMA1×) or 3G network (e.g., CDMA2000, TD-SCDMA/TD-HSPA, WCDMA/HSPA). As the 2G/3G networks were deployed earlier and optimized better than the 4G network, thus coverage areas of the 2G/3G networks are greater than a coverage area of the 4G network, which is deployed later. Accordingly, in some regions, a terminal may be disconnected from the 4G network, but can be connected to the 2G/3G networks.

First, conditions for a determination:

In the flowchart of FIG. 2, step 202 includes a determination of changes of the serving cell and/or the adjacent cell corresponding to the terminal. In detail, the determination may be made using a plurality of ways, for example, the conditions for the determination provided below can be adopted:

An identity (ID) of the serving cell and/or an identity of the adjacent cell corresponding to the terminal in the second network change, the terminal is disconnected from the second network, the terminal executes a cell reselection operation, the terminal executes a cell switch operation, or the terminal executes a cell updating operation.

Accordingly, when one of the above conditions for the determination is satisfied, it is determined that the serving cell and/or the adjacent cell corresponding to the terminal have changed.

Figure 3:
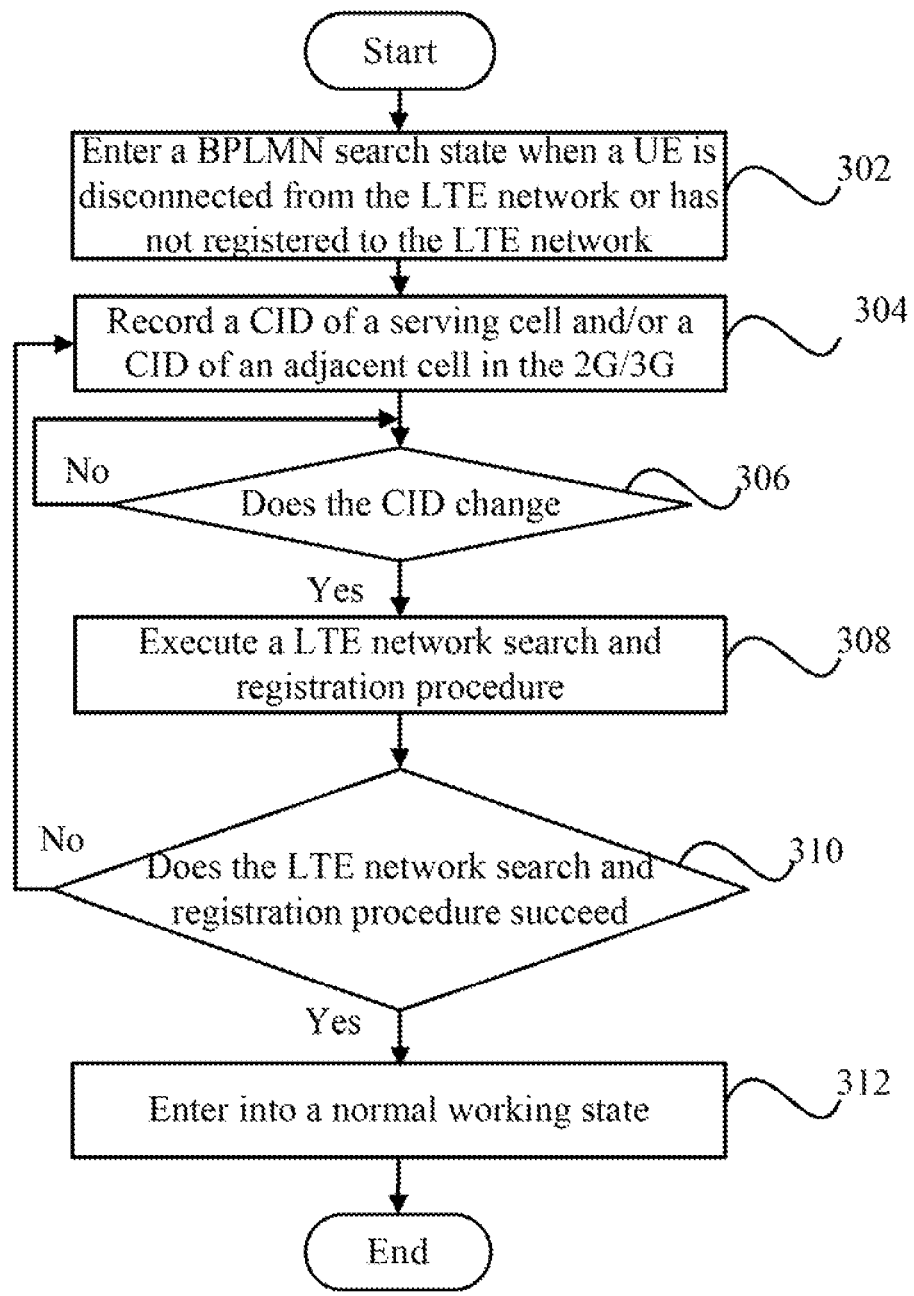
FIG. 3 shows a schematic flowchart of one embodiment of a method for performing a network search based on changes of the cells according to the present disclosure.

Second, a detailed flowchart:

A change condition of a cell ID (CID) (e.g., a CID of the serving cell and/or a CID of the adjacent cell) is provided below as an example, and detailed descriptions combined with FIG. 3 are provided below. FIG. 3 shows a schematic flowchart of one embodiment of a method for performing a network search based on changes of the cells according to the present disclosure.

As shown in FIG. 3, according to one embodiment of the present disclosure, the method for performing a network search based on changes of cell includes:

Step 302, a user equipment (UE) (e.g., the terminal) is disconnected from the LTE network and has not registered to the LTE network, then the UE enters a background public land mobile network (BPLMN) search state.

Specifically, for example, the LTE network is the first network, and the 2G/3G network is the second network.

Step 304, after the UE has registered to the 2G/3G network, a CID of the serving cell and/or a CID of the adjacent cell corresponding to the UE in the 2G/3G network are recorded.

Specifically, in some embodiments, the CID may be an identifier of a cell in a wireless network in a narrow sense, or an identifier of a cell in a broad sense, such as Cell Global Identifier (CGI).

Step 306, determining whether the CID of the serving cell and/or the CID of the adjacent changes of the cells.

Specifically, in some embodiments, the UE stores a CID recorded before (hereinafter referred to as "the recorded CID"). In other embodiments, when the UE performs or is going to perform a change of a cell, a CID of a target cell is known. Thus, by comparing the recorded CID with the CID of the target cell, the UE can determine whether or not the CID changes, and then determine whether or not the serving cell and/or the adjacent cell corresponding to the UE changes.

If the serving cell and/or the adjacent cell corresponding to the UE changes, step 308 is executed. Otherwise, keep waiting.

Step 308, based on a determination result of changes of the CID in step 306, a LTE network search and registration procedure is executed.

In detail, as a change of the CID indicates that a location of the UE has been changed with moving a wide range, thus, the UE may move to a coverage area of the LTE network. Thus, executing the LTE network search and registration procedure based on the condition that "the CID changes," not only the power consumption of the UE caused by a blind network search can be avoided, but also a success rate for the UE to reconnect to the LTE network is increased.

Step 310, determining whether the LTE network search and registration procedure succeeds. If it succeeds, step 312 is executed, otherwise, if it fails, step 304 is executed.

Step 312, the UE exits the BPLMN search state, and enters into a normal working state.

It should be understood that, a situation that the UE "is disconnected from the LTE network" as mentioned above is merely one embodiment of the present disclosure. Actually, the present disclosure may include more other embodiments, for example, when the UE is powered on at a region which is not covered by the LTE network, the UE may register to the 2G/3G network first, and then execute a LTE network search according to the method of FIG. 3. Thus, not only the LTE network can be searched quickly, but also the blind network search can be avoided, and the power consumption of the UE can be reduced.

Third, energy conservation of the UE:

In one embodiment as shown in FIG. 2 or FIG. 3, a continuous failure count of the LTE network search based on changes of the cell, can be counted. When the continuous failure count is high (e.g., the continuous failure count is greater than or equal to the predetermined count), it is indicated that the first network is not covered within a wide range. Therefore, following ways can be applied subsequently:

When the continuous failure count of the search operation for the first network is greater than or equal to a predetermined count, the terminal terminates the search operation for the first network based on changes of the serving cell and/or the adjacent cell. Thus, the power consumption of the terminal can be reduced and the standby time of the terminal can be extended.

Fourth, a combination of the changes of the cell and other technical means:

After the search operation for the first network is terminated, a timely connection to the LTE network (namely the first network) by the terminal may be influenced, thus, other technical means can be combined to resolve this question.

A first embodiment: a timer

In the above embodiments, preferably, when the continuous failure count of the search operation for the first network is greater than or equal to the predetermined count, the network search method further includes: enabling a timer, and initiating the search operation for the first network by the terminal after the timer has elapsed. If the initiated search operation fails to search for the first network by the terminal after the timer has elapsed, the timer is re-enabled.

In the above embodiment, by performing the network search method based on the timer, whenever the timer has elapsed, the terminal performs the search operation for the first network. If it succeeds, the terminal is connected to the first network. Otherwise, if failed, the timer is reset, and the search operation for the first network is re-performed when the timer has elapsed next time.

As the terminal will terminate a network search operation based on the changes of the cell (e.g., the serving cell and/or the adjacent cell), thus, by performing the network search method based on the timer as mentioned above, the power consumption of the terminal is reduced, and timeliness of the search operation for the first network can be ensured at the same time. Therefore, after the user enters/goes back the coverage area of the first network, this can avoid waiting for a long time to register to the first network.

In the above embodiment, preferably, the network search method further includes: under the condition that the initiated search operation fails to search for the first network by the terminal after the timer has elapsed, increasing a time length of the timer in a predetermined manner.

In the above embodiment, by increasing the time length of the timer, the network search frequency for the first network by the terminal can be further reduced, the power consumption of the terminal is reduced, and energy of the terminal is conserved.

Figure 4A:
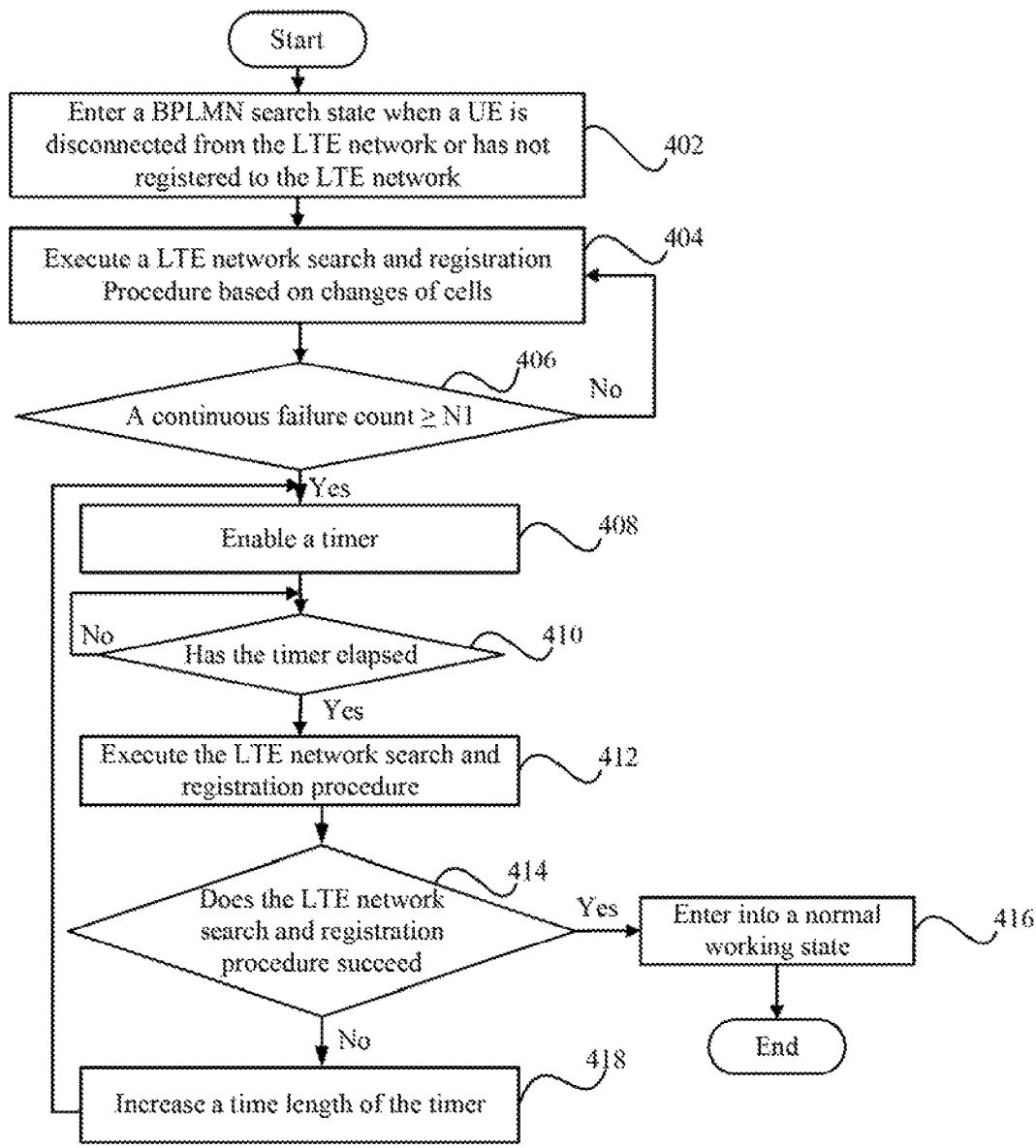
FIG. 4A to FIG. 4C show schematic flowcharts of one embodiment of a method for performing a network search based on the changes of the cells and a timer according to the present disclosure.

In detail, FIG. 4A shows a schematic flowchart of one embodiment of a method for performing a network search based on the changes of the cells and a timer according to the present disclosure.

As shown in FIG. 4A, according to one embodiment of the present disclosure, the method for performing a network search based on the changes of the cells and the timer includes:

Step 402, the UE is disconnected from the LTE network and has not registered to the LTE network, and then the UE enters a BPLMN search state.

Step 404, the UE executes a LTE network search and registration procedure based on the changes of the cells, detailed descriptions are referred to FIG. 2 or FIG. 3.

Step 406, a continuous failure count N of the LTE network search and registration procedure is counted.

If the continuous failure count N is greater than or is not less than the predetermined count N1, step 408 is executed; otherwise step 404 is executed.

Step 408, the timer is enabled, time of the timer is assumed to be "Tresearch", specifically, a time length of "Tresearch" can be set according to requirements.

Step 410, determining whether the timer has elapsed. If the timer has elapsed, step 412 is executed; otherwise, keep waiting.

Step 412, the UE executes the LTE network search and registration procedure.

As the time length of "Tresearch" is longer than a defaulted time interval of the LTE network search and registration procedure, thus, the energy of the UE can be conserved; at the same time, the LTE network search and registration procedure based on the timer can ensure the UE to connect to the LTE network timely when the UE enters/returns to the coverage area of the LTE network, and waiting time of a user can be avoided to be long.

Step 414, determining whether the LTE network search and registration procedure succeeds. If it succeeds, step 416 is executed; otherwise step 418 is executed.

Step 416, the UE exits the BPLMN search state, and enters into a normal working state.

Step 418, the time length of "Tresearch" is increased, and then the procedure returns to step 408. By increasing the time length of "Tresearch", execution times of the LTE network search and registration procedure can be reduced. It also helps to reduce the power consumption when a wide range is not covered by the LTE network or the user does not move a long distance. Certainly, the time length of the timer also can be set as a fixed time length without any adjustment.

Regarding a procedure to increase "Tresearch", following ways can be applied subsequently:

(1) setting "Threshold=n*"Tresearch"," where "n" represents execution times of the LTE network search and registration procedure corresponding to a same "Threshold."

(2) after the LTE network search and registration procedure has been executed for n times, "Threshold" has been increased to be "m" times. "Threshold" (e.g., "m" is equal to 2 or other number), as "Threshold=n*"Tresearch"," thus "Tresearch" is also increased to be "m" times "Tresearch".

(3) until "Tresearch" is increased to be a predetermined maximum value "Threshold_max", adjustment of values of "Threshold" and "Tresearch" is stopped.

It should be understood that, for one skilled in the art, the above ways are merely examples, other ways not introduced herein also can be adopted, such as the time of the timer can be set as "n×"Tresearch"", where "n" represents execution times of the LTE network search and registration procedure.

Figure 4B:
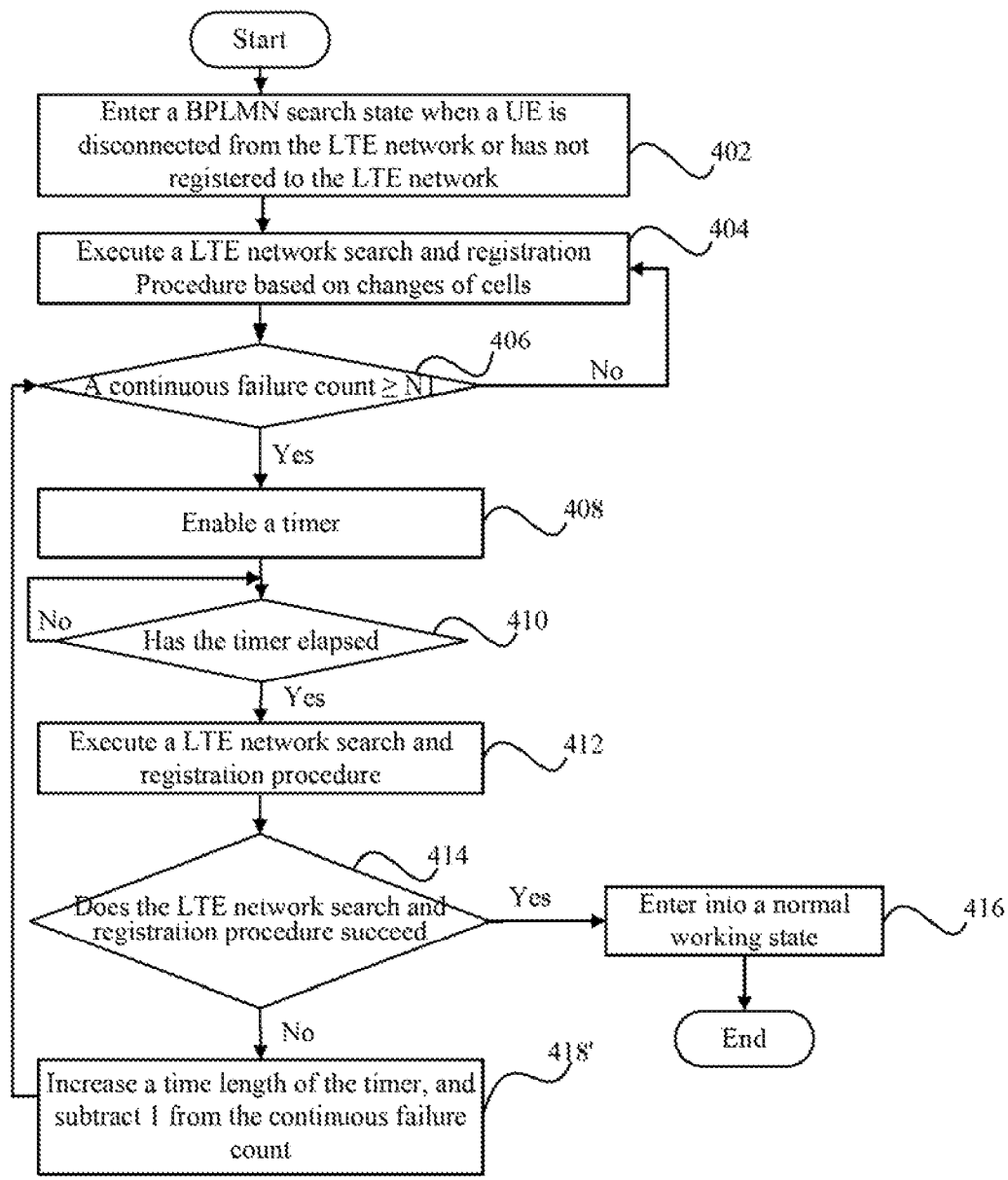

As shown in FIG. 4B, based on the procedure of FIG. 4A, step 418' (corresponding to step 418 in FIG. 4A), the continuous failure count N is also adjusted. In detail, the continuous failure count N is decreased (e.g., by subtracting 1), so the LTE network search and registration procedure based on the changes of the cells can be re-performed in step 404 as N<N1, when the procedure returns to step 406. Accordingly, a combination of "the changes of the cells" and "the timer" can reduce a network search frequency of the UE, reduce the power consumption of the UE, and ensure timeliness of reconnecting to the LTE network by the UE according to the "changes of the cells".

It should be stated that:

In FIG. 4B, "the continuous failure count N" represents continuous failure times of the LTE network search and registration procedure executed by the UE based on the changes of the cells. When another counting method is adopted, more embodiments can be provided.

Figure 4C:
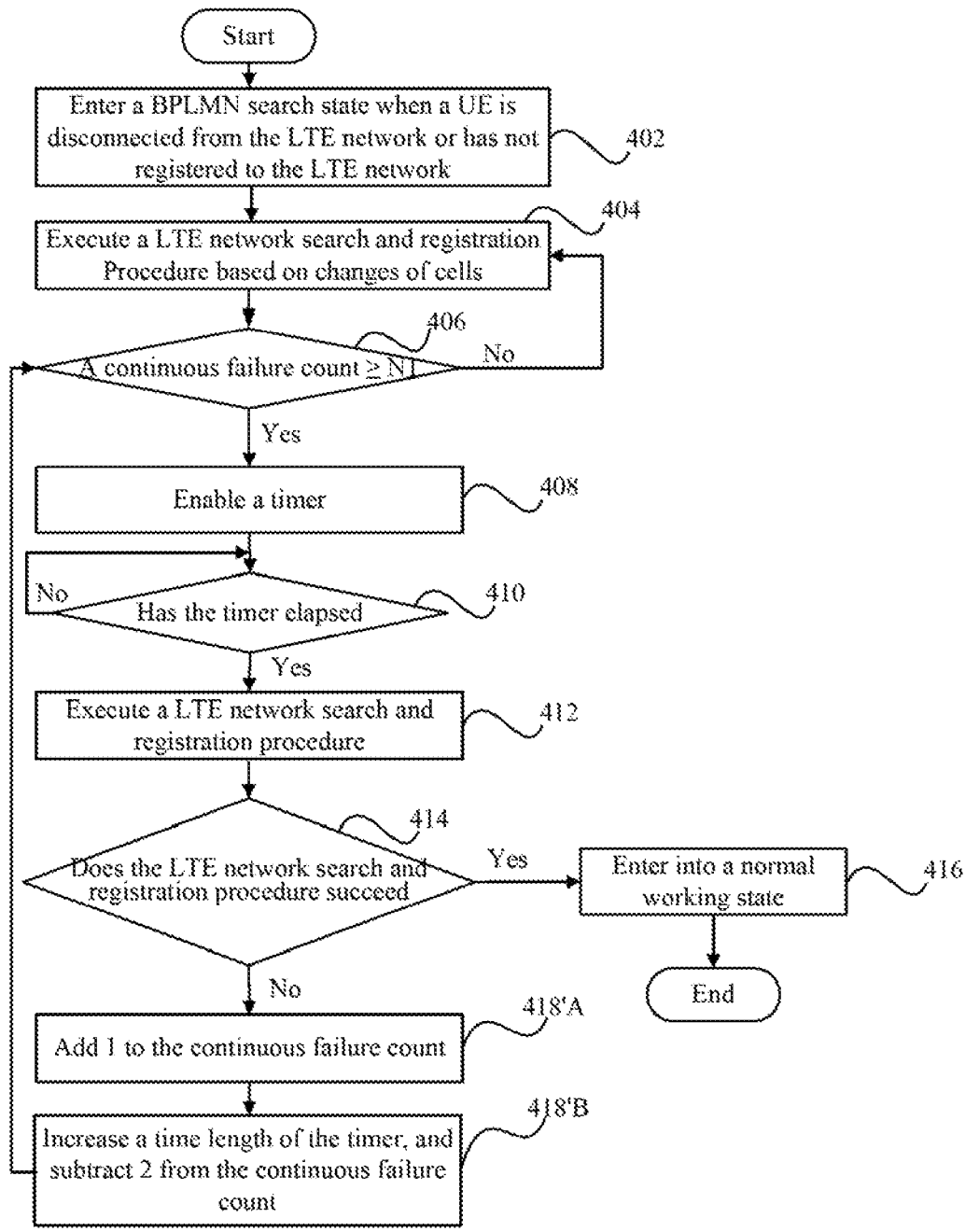

For example, a failure count of the LTE network search and registration procedure based on "the changes of the cells" and "the timer" can be calculated together. That is, once the LTE network search and registration procedure is executed and failed, "the continuous failure count N" is changed correspondingly. Thus, it has no need to distinguish triggering factors of the LTE network search and registration procedure, thus complexity of algorithm can be reduced. Specifically, as shown in FIG. 4B:

When "the continuous failure count N" corresponds to the failure times of the LTE network search and registration procedure executed by the UE based on "the changes of the cells" and "the timer", step 418' in FIG. 4B can be divided into following steps in FIG. 4C:

Step 418'A, when the LTE network search and registration procedure based on "the timer" fails, 1 is added to the continuous failure count N.

Step 418'B, a time length of the timer is increased in a predetermined manner, and 2 (or a higher value) is subtracted from the continuous failure count N. Thus it can be ensured that N<N1 when the procedure of FIG. 4C returns to step 406, the LTE network search and registration procedure based on the changes of the cells is triggered. The time length of the timer can be set as a fixed time length without any adjustment.

A second embodiment: area updating

Figure 5A:
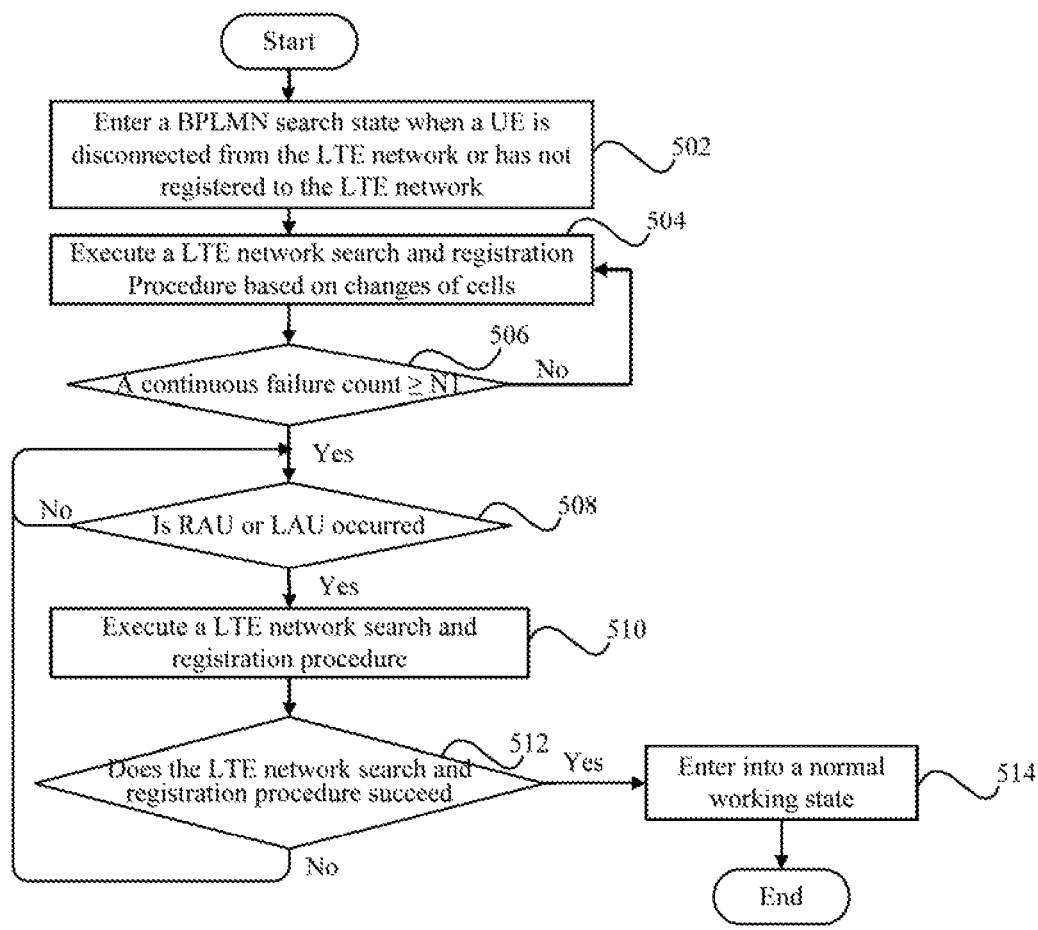
FIG. 5A to FIG. 5C show schematic flowcharts of one embodiment of a method for performing a network search based on the changes of the cells and an area updating according to the present disclosure.

FIG. 5A shows a schematic flowchart of one embodiment of a method for performing a network search based on the changes of the cells and an area updating according to the present disclosure.

As shown in FIG. 5A, according to one embodiment of the present disclosure, the method for performing a network search based on the changes of the cells and an area updating includes:

Step 502, the UE is disconnected from the LTE network and has not registered to the LTE network, and then the UE enters a BPLMN search state.

Step 504, the UE executes a LTE network search and registration procedure based on the changes of the cells, detailed descriptions are referred to FIG. 2 or FIG. 3.

Step 506, a continuous failure count N of the LTE network search and registration procedure is counted.

If the continuous failure count N is greater than or is not less than the predetermined count N1, step 508 is executed; otherwise step 504 is executed.

Step 508, determining whether the UE initiates a routing area updating (RAU) request or a location area updating (LAU) request. If the UE initiates the RAU request or the LAU request, step 510 is executed; otherwise, keep waiting.

Step 510, the UE executes the LTE network search and registration procedure.

In detail, as the RAU request or the LAU request is initiated with location change of the UE, the UE may re-enter the coverage area of the LTE network because of the location change. Therefore, initiating the search operation for the LTE network according to the RAU request or the LAU request is not a blind search, it is quite possible to search for the first network successfully. Thus, it is helpful for the user to connect the UE to the LTE network successfully and quickly, and to improve the user experience.

Step 512, determining whether the LTE network search and registration procedure succeeds. If it succeeds, step 514 is executed; otherwise step 508 is executed.

Step 514, the UE exits the BPLMN search state, and enters into a normal working state.

Figure 5B:
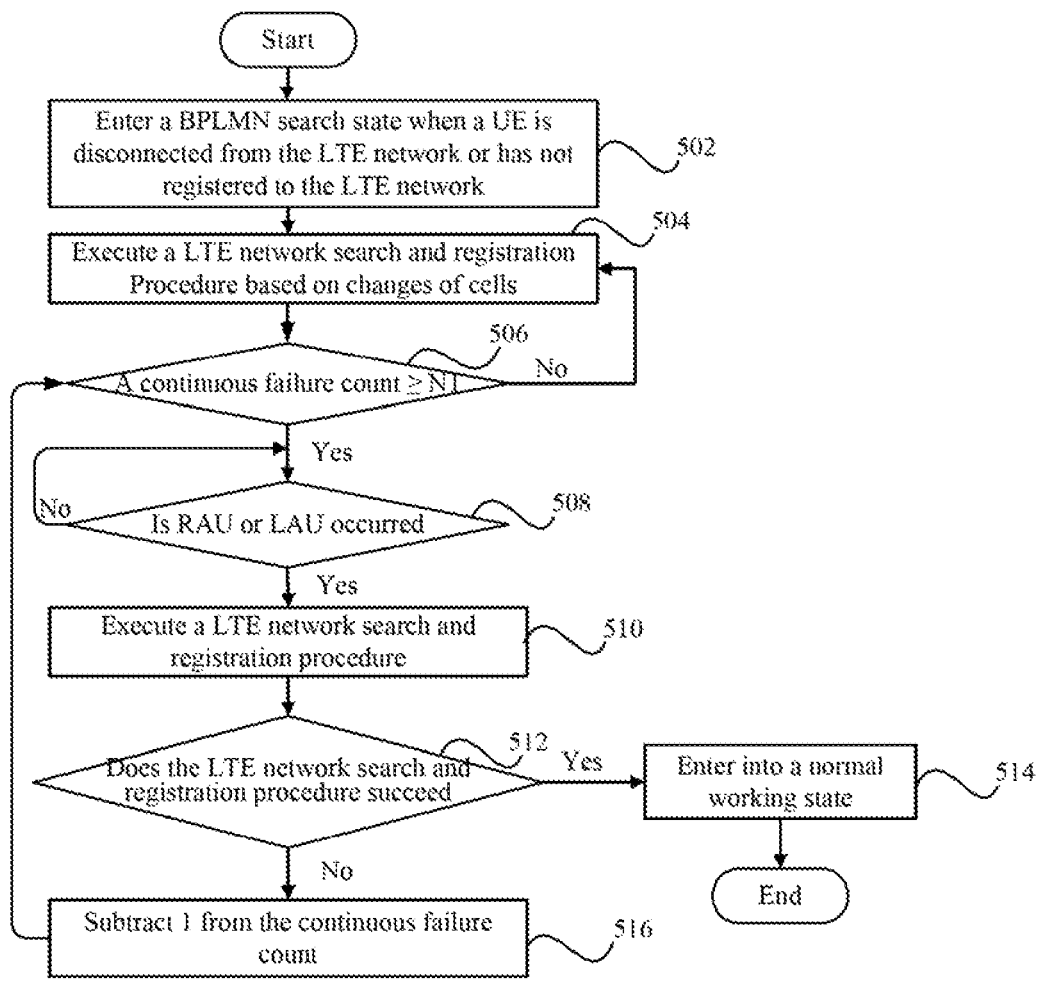

Moreover, the method for performing a network search based on the changes of the cells and an area updating in FIG. 5B, further includes:

Step 516, when the LTE network search and registration procedure based on "the RAU/LAU" fails, 1 (or a higher value) is subtracted from the continuous failure count N. Thus it can be ensured that N<N1 when the procedure of FIG. 5B returns to step 506, thereby triggering the LTE network search and registration procedure based on the changes of the cells.

Figure 5C:
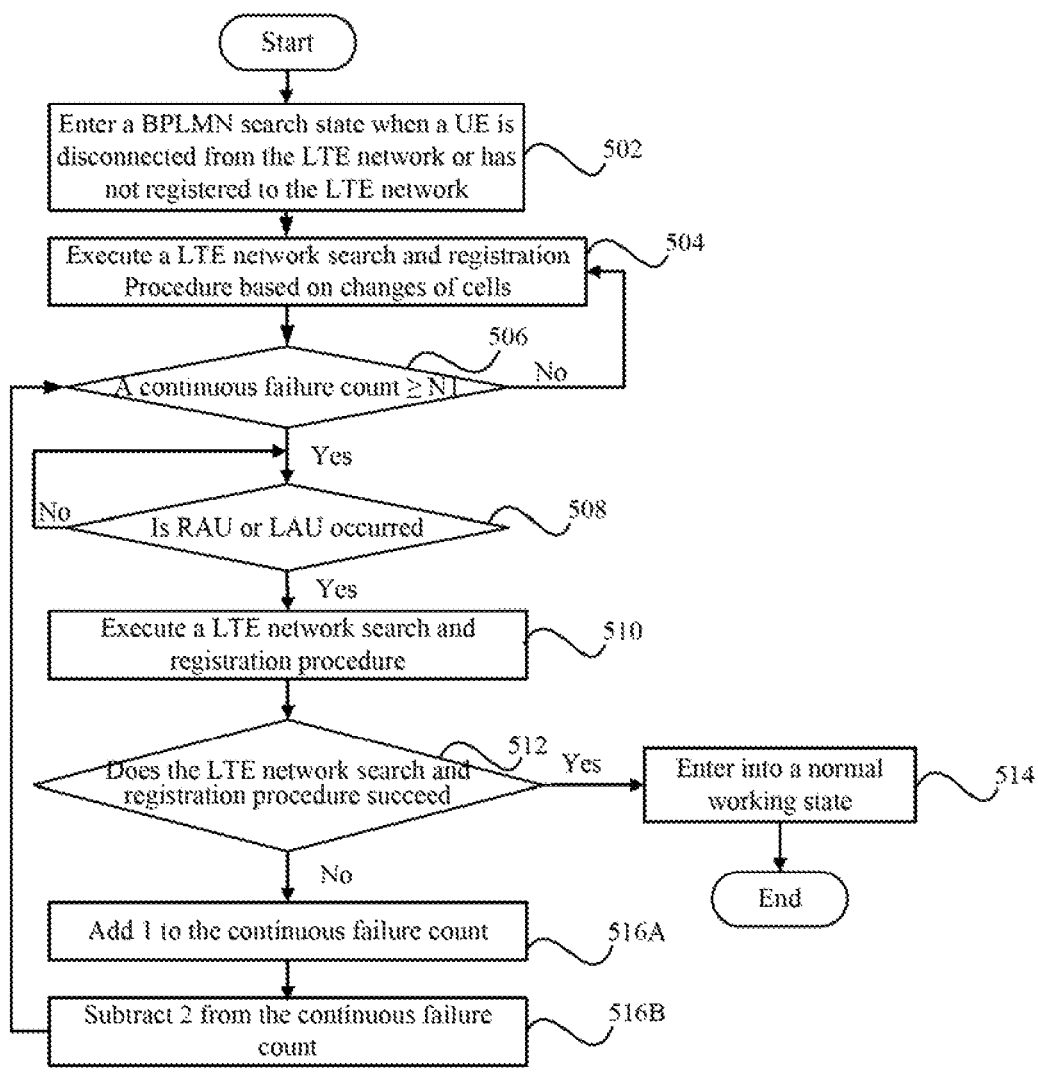

When "the continuous failure count N" in step 516 corresponds to a failure times of the LTE network search and registration procedure based on "the changes of the cells" and "the RAU/LAU", step 516 in FIG. 5B can be divided into following steps in FIG. 5C:

Step 516A, when the LTE network search and registration procedure based on "the RAU/LAU" fails, 1 is added to the continuous failure count N.

Step 516B, 2 (or a higher value) is subtracted from the continuous failure count N. Thus it can be ensured that N<N1 when the procedure of FIG. 5C returns to step 406, thereby triggering the LTE network search and registration procedure based on the changes of the cells.

A third embodiment: a data service demand

Figure 6:
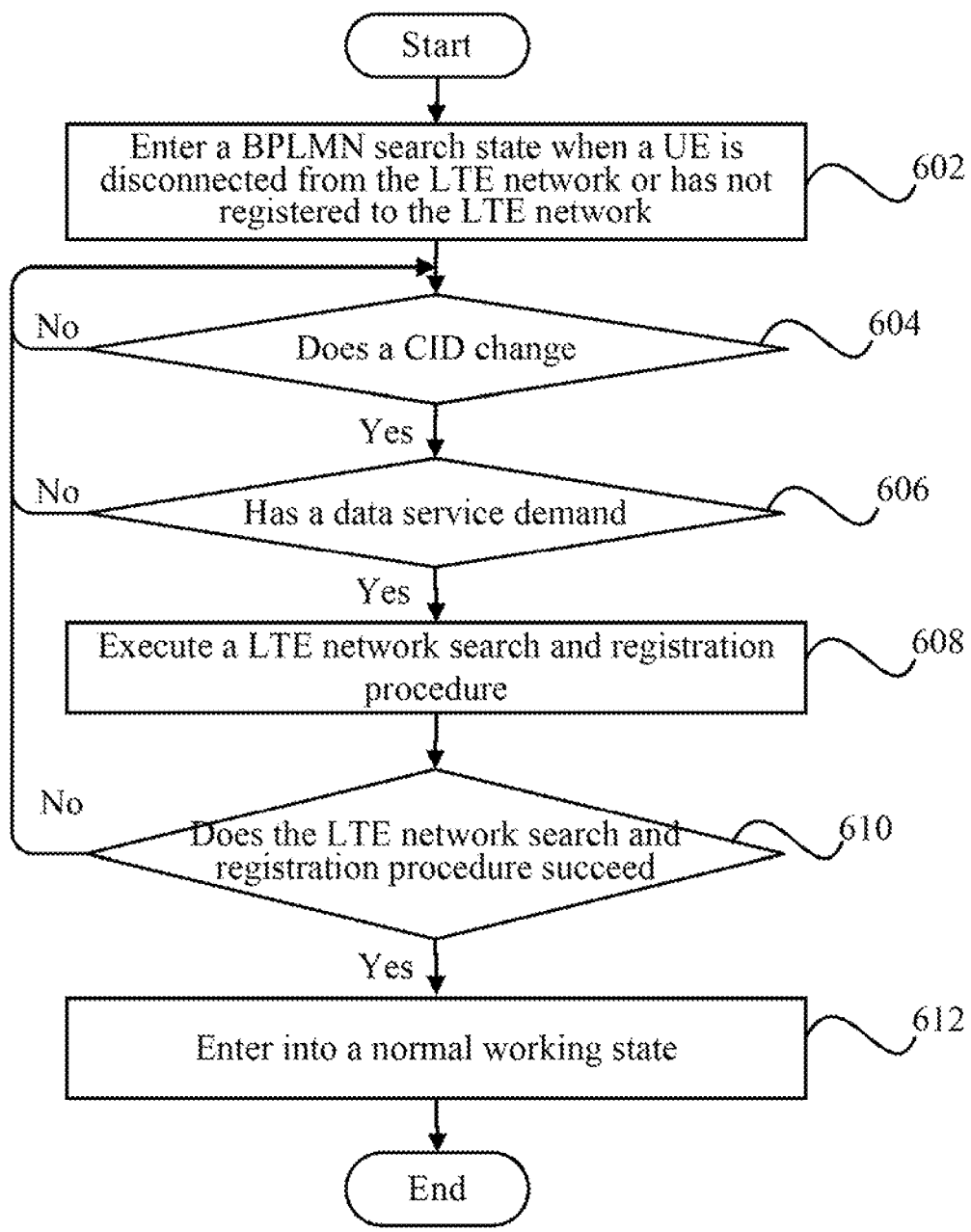
FIG. 6 shows a schematic flowchart of one embodiment of a method for performing a network search based on changes of the cells and a data service demand according to the present disclosure.

FIG. 6 shows a schematic flowchart of one embodiment of a method for performing a network search based on changes of the cells and a data service demand according to the present disclosure.

As shown in FIG. 6, according to one embodiment of the present disclosure, the method for performing a network search based on changes of the cells and a data service demand includes:

Step 602, the UE is disconnected from the LTE network and has not registered to the LTE network, and then the UE enters a BPLMN search state.

Step 604, determining whether a CID of a serving cell and/or a CID of an adjacent cell corresponding to the UE in the 2G/3G network change. If change, step 606 is executed. Otherwise, keep waiting. Detailed descriptions of a determination of the CID are referred to FIG. 2 or FIG. 3.

Step 606, determining whether the UE has a data service demand. If so, step 608 is executed; otherwise step 604 is executed.

In detail, when the CID of the serving cell and/or the CID of the adjacent cell corresponding to the UE change, this indicates that a location of the UE has been changed with moving a wide range, so that the UE may remove to a coverage area of the LTE A success rate for the UE to reconnect to the LTE network is thereby increased.

Under the condition that the UE can find the LTE network, the data service demand represents whether the user of the UE has a need to execute the LTE network search and registration procedure. Thus, by combining determinations of the changes of the cells and the data service demand, for every search for the LTE network, not only the success rate is increased, but also it is in accord with actual requirements of the user, thereby reducing search times as much as possible and reducing the power consumption of the UE.

Step 608, the LTE network search and registration procedure is executed.

Step 610, determining whether the LTE network search and registration procedure succeeds. If it succeeds, step 612 is executed, otherwise step 604 is executed.

Step 612, the UE exits the BPLMN search state, and enters into a normal working state.

A fourth embodiment: a variable value of a parameter

When the CID of the serving cell and/or the CID of the adjacent cell corresponding to the UE change, this indicates that a location of the UE has been changed with moving a wide range, so that the UE may remove to a coverage area of the LTE, therefore a success rate for the UE to reconnect to the LTE network is increased.

When the CID of the serving cell and/or the CID of the adjacent cell corresponding to the UE are unchanged, other ways can be used to determining a location change of the UE. In detail, variable values of one or more selected parameters can be used to determine the location change of the UE. A detailed disclosure of a determination of the location change of the UE based on the variable values of "the selected parameters" and a search operation for the LTE network, is given below, from two aspects which include a "direct detection" and an "indirect detection."

Figure 7:
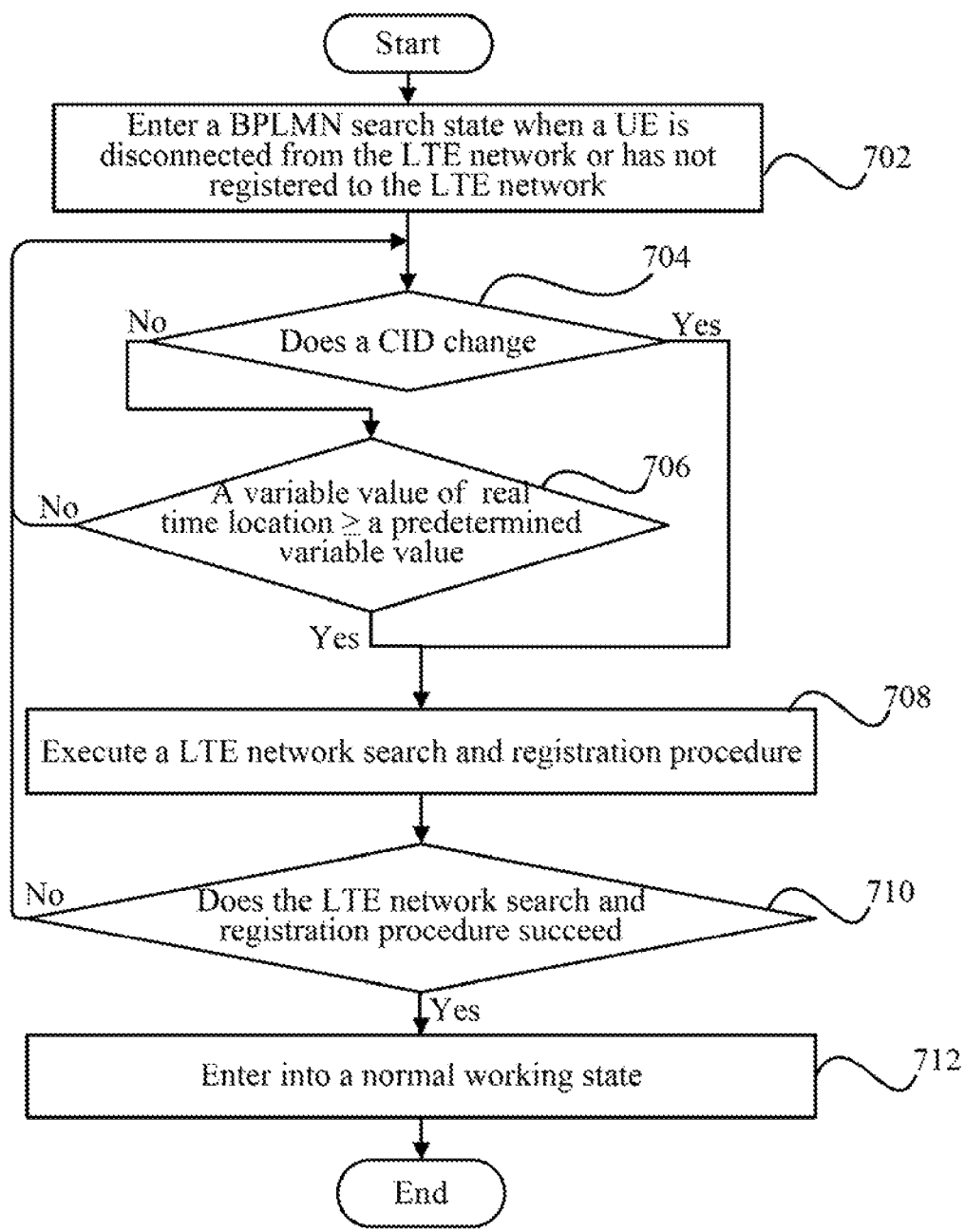
FIG. 7 shows a schematic flowchart of one embodiment of a method for performing a network search based on changes of the cells and a variable value of location change according to the present disclosure.

In a first embodiment based on the direct detection:

FIG. 7 shows a schematic flowchart of one embodiment of a method for performing a network search based on changes of the cells and a variable value of location change according to the present disclosure.

As shown in FIG. 7, according to one embodiment of the present disclosure, the method for performing a network search based on changes of the cells and a variable value of location change includes:

Step 702, a UE is disconnected from the LTE network and has not registered to the LTE network, then the UE enters a BPLMN search state.

Step 704, determining whether a CID of a serving cell and/or a CID of an adjacent cell corresponding to the UE in the 2G/3G network change. If change, step 708 is executed. Otherwise step 706 is executed. Detailed descriptions of a determination of the CID are referred to FIG. 2 or FIG. 3.

Step 706, determining whether a variable value of real time location of the UE is greater than or equal to a predetermined variable value, according to acquired real time location information of the UE. If yes, step 708 is executed; otherwise step 704 is executed.

In detail, the variable value of real time location of the UE may be a movement distance of the UE started from the last time that the UE failed to search for the LTE network to now.

By the direct detection and determination of the movement distance, it can be ensured that the location of the UE has been changed with moving a wide range, thereby increasing the possibility that the UE removes to a coverage area of the LTE network. The success rate for the UE to search and register to the LTE network is increased, so as to reduce the search times and reduce the power consumption.

The real time location information of the UE can be acquired by using a satellite positioning module. In some embodiments, the satellite positioning module can support one or more systems of Global Positioning System (GPS), Global Navigation Satellite System (GLONASS), and Galileo Satellite Navigation System.

Step 708, a LTE network search and registration procedure is executed.

Step 710, determining whether the LTE network search and registration procedure succeeds. If it succeeds, step 712 is executed, otherwise step 704 is executed.

Step 712, the UE exits the BPLMN search state, and enters into a normal working state.

Figure 8:
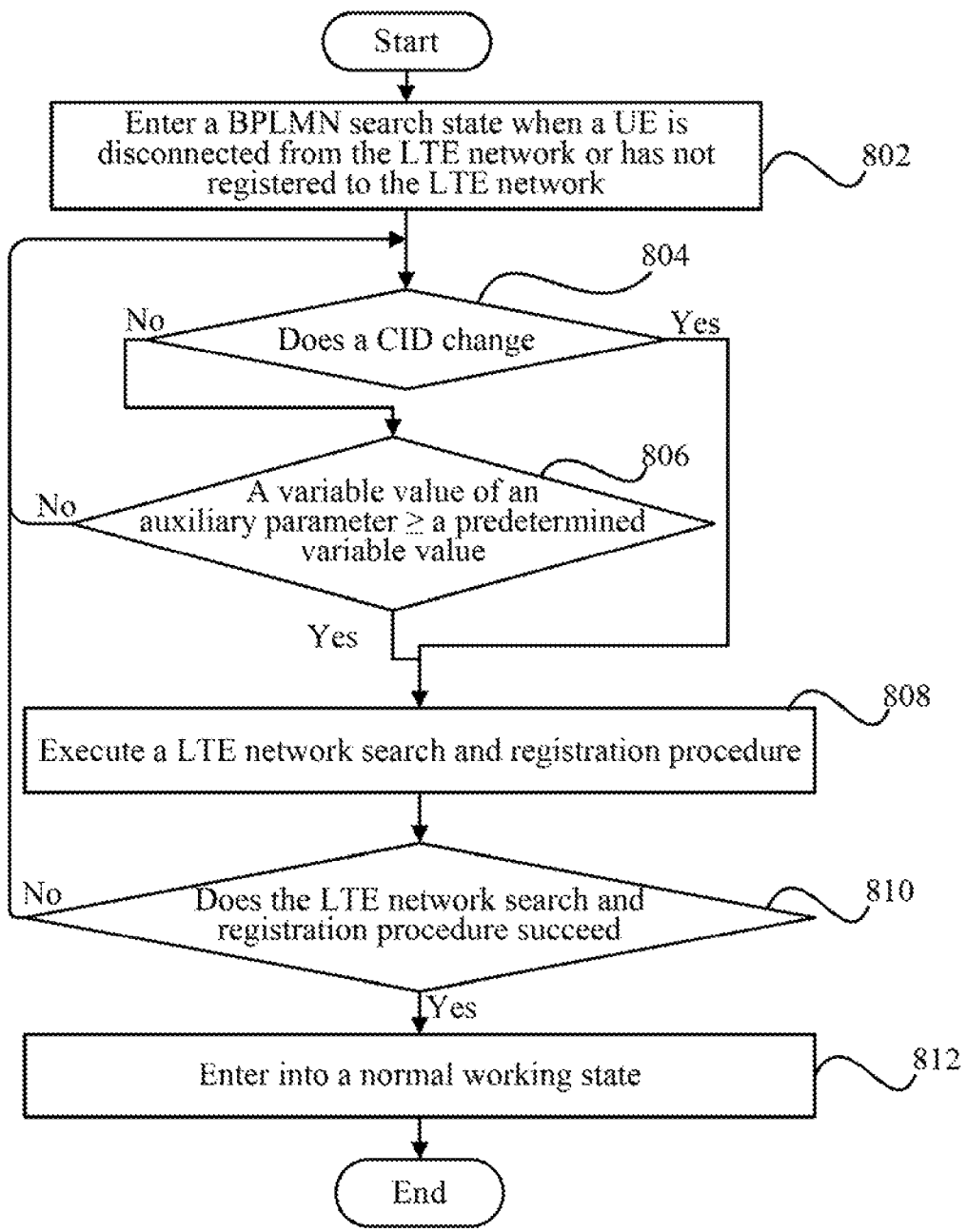
FIG. 8 shows a schematic flowchart of one embodiment of a method for performing a network search based on changes of the cells and a variable value of an auxiliary parameter according to the present disclosure.

In a second embodiment based on the indirect detection:

To illustrate and to distinguish, other selected parameters except "the real time location information" are hereinafter called "auxiliary parameters." FIG. 8 shows a schematic flowchart of one embodiment of a method for performing a network search based on changes of the cells and a variable value of an auxiliary parameter according to the present disclosure.

As shown in FIG. 8, according to one embodiment of the present disclosure, the method for performing a network search based on changes of the cells and a variable value of an auxiliary parameter includes:

Step 802, the UE is disconnected from the LTE network and has not registered to the LTE network, and then the UE enters a BPLMN search state.

Step 804, determining whether a CID of a serving cell and/or a CID of an adjacent cell corresponding to the UE in the 2G/3G network change. If change, step 808 is executed. Otherwise step 806 is executed. Detailed descriptions of a determination of the CID are referred to FIG. 2 or FIG. 3.

Step 806, determining whether a variable value of an auxiliary parameter of the UE or the serving cell and/or the adjacent cell is greater than or equal to a predetermined variable value. If yes, step 808 is executed; otherwise step 804 is executed.

In detail, the auxiliary parameter may include at least one or a combination of: a signal strength of the serving cell and/or a signal strength of the adjacent cell corresponding to the UE, transmission power strength and/or transmission signal strength of the UE, transmission delay and/or receiving delay corresponding to the UE, a bit error rate and/or a block error rate corresponding to the UE, a signal to noise ratio (SNR) and/or a signal to interference ratio (SIR) corresponding to the UE.

Moreover, variable values of one or more auxiliary parameters as mentioned above can be determined when the serving cell and/or the adjacent cell correspond to the UE do not changed, namely when the UE remains in one serving cell. When the variable values of one or more auxiliary parameters are greater than or equal to a corresponding predetermined variable value, it can be determined that the location of the UE has been changed with moving a wide range, thereby initiating a LTE network search and registration procedure, so as to increase the success rate for the UE to search and register to the LTE network, and avoid power consumption of the UE caused by a blind LTE network search and registration.

At the same time, the above auxiliary parameters can be measured from the last time that the UE failed to search for the LTE network to now.

Step 808, the LTE network search and registration procedure is executed.

Step 810, determining whether the LTE network search and registration procedure succeeds. If it succeeds, step 812 is executed, otherwise step 804 is executed.

Step 812, the UE exits the BPLMN search state, and enters into a normal working state.

Figure 9:
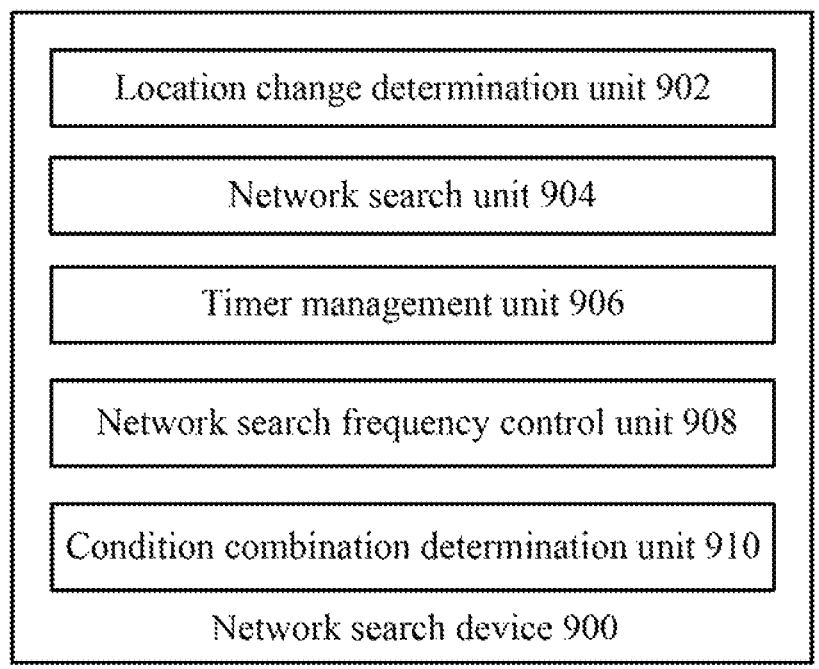
FIG. 9 shows a schematic diagram of one embodiment of a network search device according to the present disclosure.

FIG. 9 shows a schematic diagram of one embodiment of a network search device according to the present disclosure.

As shown in FIG. 9, a network search device 900 according to one embodiment of the present disclosure, includes: a location change determination unit 902 configured to determine whether a serving cell and/or an adjacent cell corresponding to the terminal in a second network change, when the terminal is disconnected from a first network or has not registered to the first network and the terminal is residing in the second network; and a network search unit 904 configured to perform a search operation for the first network when the serving cell and/or the adjacent cell corresponding to the terminal change.

The word "unit" as used hereinafter, refers to logic embodied in hardware or firmware, or to a collection of software instructions, written in a programming language, such as, for example, Java, C, or assembly. One or more software instructions in the function units may be embedded in firmware (e.g., the network search device 900). It will be appreciated that the function units may include connected logic units, such as gates and flip-flops, and may include programmable units, such as programmable gate arrays or processors. The function units described herein may be implemented as either software and/or hardware units and may be stored in a storage device. The storage device can be any type of non-transitory computer-readable storage medium or other computer storage device, such as a hard disk drive, a compact disc, a digital video disc, a tape drive, a storage card (e.g., a memory stick, a smart media card, a compact flash card), or other suitable storage medium, for example. The function units, when controlled by a processor, can execute the functions as mentioned above or as follows.

The network search device 900 can be a firmware, which may be installed in a terminal (e.g., a terminal 1000 shown in FIG. 10), which includes at least one processor and a storage device. The location change determination unit 902, the network search unit 904, and other units or subunits as described below, include computerized instructions in the form of one or more computer-readable programs that can be stored in the storage device of the terminal, and can be implemented by the at least one processor.

In the above embodiment, for a multi-mode terminal, when the terminal is disconnected from the first network, continuity of communication can be ensured by keeping the terminal residing in the second network. In the second network, as the terminal must be connected to the adjacent cell, thus location changes of the terminal in the second network can be reflected directly by acquiring changes of the serving cell and/or the adjacent cell to which the terminal is connected in the second network. Namely, changes of the serving cell and/or the adjacent cell must be caused by location change of the terminal, and a location of the terminal may change dramatically. In addition, in other embodiments, when the terminal is powered on in a region which is not covered by the first network, the present disclosure can make the terminal register to the second network first, and ensure that the terminal searches for the first network quickly according to the above search operation based on the location change. At the same time, a blind network search can be avoided, and the power consumption of the terminal can be reduced.

Accordingly, based on the location change of the terminal, the terminal may enter/re-enter into a coverage area of the first network. By performing the search operation for the first network at this moment, a success rate for the search operation is increased, increase of power consumption of the terminal caused by the blind network search can be avoided, and standby time of the terminal can be extended.

In the above embodiment, the first network and the second network can be any two different wireless communication networks, for example, to base stations having same positions, the coverage area of the first network may be smaller than a coverage area of the second network. In some embodiments, the first network may be the 4G network (e.g., LTE), and the second network may be 2G network (e.g., GSM, GPRS, EDGE CDMA1x) or 3G network (e.g., CDMA2000, TD-SCDMA/TD-HSPA, WCDMA/HSPA). As the 2G/3G networks were deployed earlier and optimized better than the 4G network, thus coverage areas of the 2G/3G networks are greater than a coverage area of the 4G network, which is deployed later. Accordingly, in some regions, a terminal may be disconnected from the 4G network, but can be connected to the 2G/3G networks.

In the above embodiment, preferably, the location change determination unit 902 determines that the serving cell and/or the adjacent cell corresponding to the terminal change when: an identity of the serving cell and/or an identity of the adjacent cell corresponding to the terminal in the second network change, the terminal is disconnected from the second network, the terminal executes a cell selection operation or a cell reselection operation in the second network, the terminal executes a cell switch operation in the second network, or the terminal executes a cell updating operation in the second network.

In the above embodiment, preferably, the network search unit 904 is further configured to terminate the search operation for the first network based on changes of the serving cell and/or the adjacent cell, when a continuous failure count of the search operation for the first network is greater than or equal to a predetermined count.

In the above embodiment, by calculating the continuous failure count, it is indicated that the first network is not covered within a wide range when the continuous failure count becomes more (e.g., the continuous failure count is greater than or equal to the predetermined count). Therefore, even if the serving cell and/or the adjacent cell corresponding to the terminal change, the search operation for the first network is not performed, so as to reduce the power consumption of the terminal and extend the standby time of the terminal.

In the above embodiment, preferably, the network search device 900 further includes a timer management unit 906 configured to enable a timer when the continuous failure count of the search operation for the first network is greater than or equal to the predetermined count, and the network search unit 904 further configured to initiate the search operation for the first network after the timer has elapsed.

In the above embodiment, by performing the network search method based on the timer, once the timer has elapsed, the terminal performs the search operation for the first network. If it succeeds, the terminal is connected to the first network. Otherwise, if it fails, the timer is reset, and the search operation for the first network is re-performed when the timer has elapsed next time.

As the terminal will terminate a network search operation based on changes of cell (e.g., the serving cell and/or the adjacent cell), thus, by performing the network search method based on the timer as mentioned above, the power consumption of the terminal is reduced, and timeliness of the search operation for the first network can be ensured at the same time. Therefore, after the user enters/goes back the coverage area of the first network, this can avoid waiting for a long time to register to the first network.

In the above embodiment, preferably, the network search device 900 further includes: a network search frequency control unit 908 configured to subtract a predetermined number from the continuous failure count of the search operation under the condition that the search operation fails to search for the first network after the timer has elapsed, and the network search unit 904 further configured to re-perform the search operation for the first network based on the changes of the serving cell and/or the adjacent cell.

In the above embodiment, when the network search operation based on the timer fails, regarding that a network search frequency based on the timer is low, the terminal can re-perform the search operation based on the changes of the cell by modifying the continuous failure count (e.g., reducing the continuous failure count to less than the predetermined count), for improving the timeliness of connecting to the first network by the terminal. Therefore, a long timeout period of the timer can be avoided, and waiting time of the user can be shortened.

In the above embodiment, preferably, the timer management unit 906 is further configured to increase a time length of the timer in a predetermined manner under the condition that the search operation fails to search for the first network after the timer has elapsed.

In the above embodiment, by increasing the time length of the timer, the network search frequency for the first network by the terminal can be further reduced, the power consumption of the terminal is reduced, and energy of the terminal is conserved. Especially when the terminal is moving quickly within a wide range which is not covered by the LTE network, search times can be reduced obviously.

In the above embodiment, preferably, when the continuous failure count of the search operation for the first network is greater than or equal to the predetermined count, the network search unit 904 is further configured to initiate the search operation for the first network, under the condition that the terminal initiates a routing area updating request or a location area updating request in the second network.

In the above embodiment, as the routing area updating request or the location area updating request is initiated with location change of the terminal, and the terminal may re-enter the coverage area of the first network because of the location change. Therefore, initiating the search operation for the first network according to the routing area updating request or the location area updating request will not be a blind search, it is quite possible to search for the first network successfully. Thus, it is helpful for the user to connect the terminal to the first network successfully and quickly, and to improve the user experience.

In the above embodiment, preferably, the network search device 900 further includes: a network search frequency control unit 908 configured to subtract a predetermined number from the continuous failure count of the search operation under the condition that the initiated search operation based on the routing area updating request or the location area updating request, fails to search for the first network; and the network search unit 904 further configured to re-perform the search operation for the first network based on the changes of the serving cell and/or the adjacent cell.

In the above embodiment, if the search operation for the first network based on the routing area updating request or the location area updating request still fails, the terminal can re-perform the search operation based on the changes of the cell by modifying the continuous failure count (e.g., reducing the continuous failure count to less than the predetermined count), for improving the timeliness of connecting to the first network by the terminal. Therefore, a long time waiting for the terminal to initiate the routing area updating request or the location area updating request can be avoided, and the waiting time of the user can be shortened.

In any one of the above embodiments, preferably, the network search device 900 further includes: a condition combination determination unit 910 configured to determine whether the terminal accords with a combination of conditions that: the terminal has a data service demand, and/or a variable value of a selected parameter, selected by the terminal in the second network, is greater than or equal to a predetermined variable value when the serving cell and/or the adjacent cell corresponding to the terminal are unchanged; the network search unit 904 further configured to initiate the search operation for the first network when the terminal accords with the combination of the conditions; and the selected parameter comprising at least one or a combination of: a signal strength of the serving cell and/or a signal strength of the adjacent cell corresponding to the terminal, transmission power strength and/or transmission signal strength of the terminal, transmission delay and/or receiving delay corresponding to the terminal, a bit error rate and/or a block error rate corresponding to the terminal, a signal to noise ratio (SNR) and/or a signal to interference ratio (SIR), and real time location information of the terminal.

In the above embodiment, the search operation for the first network is performed only when the terminal has a data service demand. Thus, it is not only in accord with user psychology, but also able to connect to the first network timely, and a blind network search executed by the terminal can be avoided.

In other embodiments, if the location change of the terminal cannot be determined according to changes of the cell, other ways can be used to determine the location change of the terminal. In detail, when the location change of terminal is big, the variable value(s) of the selected parameter(s) may change very much correspondingly (e.g., the variable value(s) of the selected parameter(s) is/are changed to be greater than or equal to the predetermined variable value), and the terminal may enter/re-enter the coverage area of the first network. Thus, by determining the variable value(s) of the selected parameter(s), the location change of the terminal may be determined. At this point, a determination can also be made as to whether to allow the terminal to perform the search operation for the first network or not. Therefore, the blind network search can be avoided, the power consumption of the terminal can be reduced, and the energy of the terminal is conserved.

Figure 10:
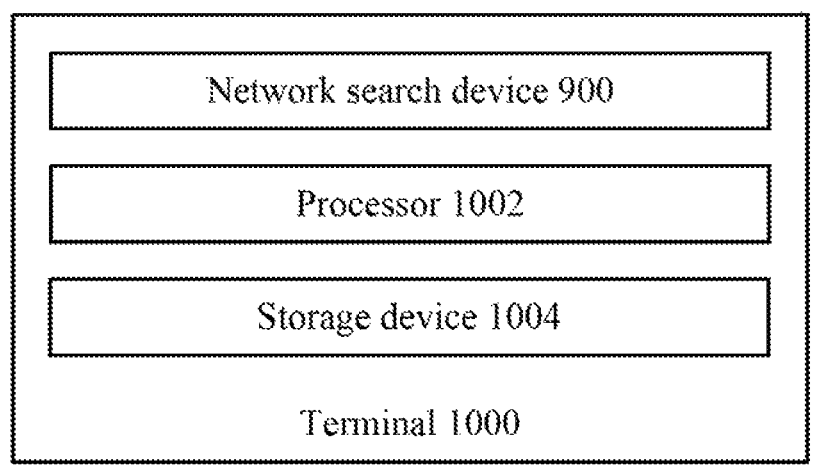
FIG. 10 shows a schematic diagram of one embodiment of a terminal according to the present disclosure.

FIG. 10 shows a schematic diagram of one embodiment of a terminal according to the present disclosure.

As shown in FIG. 10, a terminal 1000 of one embodiment of the present disclosure includes the network search device 900 as shown in FIG. 9.

As shown in FIG. 10, according to one embodiment of the present disclosure, a terminal 1000 includes the network search device 900 as shown in FIG. 9. The terminal 1000 may be a mobile phone, a tablet computer, a personal digital assistant, a notebook computer, or other computing device. The terminal 1000 further includes at least one processor 1002 and a storage device 1004. FIG. 10 illustrates only one example of the terminal 1000 that may include more or fewer components than illustrated, or have a different configuration of the various components.

The at least one processor 1002 is used to execute a plurality of units (e.g., the location change determination unit 902 and the network search unit 904) or subunits in the network search device 900 and other applications, such as an operating system, installed in the terminal 1000. The storage device 1004 store the computerized instructions of a plurality of units or subunits in the network search device 900, and one or more programs, such as the operating system and applications of the terminal 1000. The storage device 1004 can be any type of non-transitory computer-readable storage medium or other computer storage device, such as a hard disk drive, a compact disc, a digital video disc, a tape drive, a storage card (e.g., a memory stick, a smart media card, a compact flash card), or other suitable storage medium, for example.

The present disclosure has been explicated above by referring to the drawings. The present disclosure provides a network search method, a network search device and a terminal, based on the location change of the terminal, not only the network search frequency or search times for the first network can be reduced, to avoid a blind network search which may result in wasting power consumption of the terminal, but also the terminal can be connected to a specific network as soon as possible, and the user experience is improved.

Although certain inventive embodiments of the present disclosure have been specifically described, the present disclosure is not to be construed as being limited thereto. Various changes or modifications may be made to the present disclosure without departing from the scope and spirit of the present disclosure.

We claim:

1. A network search method executed by a terminal, comprising:
   keeping residing in a second network when the terminal is disconnected from a first network or has not registered to the first network; and
   performing a search operation for the first network, when a serving cell or an adjacent cell in the second network corresponding to the terminal changes;
   terminating the search operation for the first network when a continuous failure count of the search operation for the first network is greater than or equal to a predetermined count; and
   initiating the search operation for the first network, under the condition that the terminal initiates a routing area updating request or a location area updating request in the second network.

2. The method of claim 1, wherein the serving cell or the adjacent cell corresponding to the terminal is determined to change when:
   an identity of the serving cell or an identity of the adjacent cell corresponding to the terminal in the second network change, or
   the terminal is disconnected from the second network, or
   the terminal executes a cell selection operation or a cell reselection operation in the second network, or
   the terminal executes a cell switch operation in the second network, or
   the terminal executes a cell updating operation in the second network.

3. The method of claim 1, when the continuous failure count of the search operation for the first network is greater than or equal to the predetermined count, further comprising:
   enabling a timer, and initiating the search operation for the first network after the timer has elapsed.

4. The method of claim 3, further comprising:
   subtracting a predetermined number from the continuous failure count of the search operation under the condition that the search operation fails to search for the first network by the terminal after the timer has elapsed, and re-performing the search operation for the first network.

5. The method of claim 3, further comprising:
   under the condition that the search operation fails to search for the first network by the terminal after the timer has elapsed, setting a fixed time length without adjusting the time length of the timer or increasing the time length of the timer in a predetermined manner.

6. The method of claim 1, further comprising:
   subtracting a predetermined number from the continuous failure count of the search operation under the condition that the initiated search operation based on the routing area updating request or the location area updating request, fails to search for the first network; and
   re-performing the search operation for the first network.

7. The method of claim 1, further comprising:
   under the condition that the terminal has a data service demand, or a variable value of a selected parameter, selected by the terminal in the second network, is greater than or equal to a predetermined variable value when the serving cell or the adjacent cell corresponding to the terminal is unchanged, performing the search operation for the first network; and
   the selected parameter comprising at least one or a combination of:
   a signal strength of the serving cell or a signal strength of the adjacent cell corresponding to the terminal, transmission power strength or transmission signal strength of the terminal, transmission delay or receiving delay corresponding to the terminal, a bit error rate or a block error rate corresponding to the terminal, a signal to noise ratio (SNR) or a signal to interference ratio (SIR), and real time location information of the terminal.

8. A terminal, comprising:
   at least one processor; and
   a storage device storing a plurality of instructions, which when executed by the processor, causes the at least one processor to:
   determine whether a serving cell or an adjacent cell in a second network corresponding to the terminal changes, when the terminal is disconnected from a first network or has not registered to the first network and the terminal is residing in the second network; and
   perform a search operation for the first network when the serving cell or the adjacent cell corresponding to the terminal changes;
   terminate the search operation for the first network when a continuous failure count of the search operation for the first network is greater than or equal to a predetermined count; and
   initiate the search operation for the first network, under the condition that the terminal initiates a routing area updating request or a location area updating request in the second network.

9. The terminal of claim 8, wherein the serving cell or the adjacent cell corresponding to the terminal is determined to change when:
   an identity of the serving cell or an identity of the adjacent cell corresponding to the terminal in the second network change, or
   the terminal is disconnected from the second network, or
   the terminal executes a cell selection operation or a cell reselection operation in the second network, or
   the terminal executes a cell switch operation in the second network, or
   the terminal executes a cell updating operation in the second network.

10. The terminal of claim 8, wherein the at least one processor further:
    enables a timer when the continuous failure count of the search operation for the first network is greater than or equal to the predetermined count, and
    initiates the search operation for the first network after the timer has elapsed.

11. The terminal of claim 10, wherein the at least one processor further:
    subtracts a predetermined number from the continuous failure count of the search operation under the condition that the search operation fails to search for the first network after the timer has elapsed, and
    re-performs the search operation for the first network.

12. The terminal of claim 10, wherein the at least one processor further:
    increases a time length of the timer in a predetermined manner under the condition that the search operation fails to search for the first network after the timer has elapsed.

13. The terminal of claim 8, wherein the at least one processor further:
    subtracts a predetermined number from the continuous failure count of the search operation under the condition that the initiated search operation based on the routing area updating request or the location area updating request, fails to search for the first network; and re-performs the search operation for the first network.

14. The terminal of claim 8, wherein the at least one processor further:
   determines whether the terminal accords with a combination of conditions that: the terminal has a data service demand, or a variable value of a selected parameter, selected by the terminal in the second network, is greater than or equal to a predetermined variable value when the serving cell or the adjacent cell corresponding to the terminal is unchanged;
   initiates the search operation for the first network when the terminal accords with the combination of the conditions; and
   the selected parameter comprising at least one or a combination of:
   a signal strength of the serving cell or a signal strength of the adjacent cell corresponding to the terminal, transmission power strength or transmission signal strength of the terminal, transmission delay or receiving delay corresponding to the terminal, a bit error rate or a block error rate corresponding to the terminal, a signal to noise ratio (SNR) or a signal to interference ratio (SIR), and real time location information of the terminal.

15. A non-transitory storage medium having stored thereon instructions that, when executed by a processor of a terminal, causes the terminal to perform a network search method, the network search method comprising:
   keeping residing in a second network when the terminal is disconnected from a first network or has not registered to the first network; and
   performing a search operation for the first network, when a serving cell or an adjacent cell in the second network corresponding to the terminal changes;
   terminating the search operation for the first network when a continuous failure count of the search operation for the first network is greater than or equal to a predetermined count; and
   initiating the search operation for the first network, under the condition that the terminal initiates a routing area updating request or a location area updating request in the second network.

16. The non-transitory storage medium according to claim 15, wherein the serving cell or the adjacent cell corresponding to the terminal is determined to change when:
   an identity of the serving cell or an identity of the adjacent cell corresponding to the terminal in the second network change, or
   the terminal is disconnected from the second network, or
   the terminal executes a cell selection operation or a cell reselection operation in the second network, or
   the terminal executes a cell switch operation in the second network, or
   the terminal executes a cell updating operation in the second network.

17. The non-transitory storage medium according to claim 15, wherein the network search method further comprises:
   when the continuous failure count of the search operation for the first network is greater than or equal to the predetermined count, enabling a timer, and initiating the search operation for the first network after the timer has elapsed.

18. The non-transitory storage medium according to claim 17, wherein the network search method further comprises:
   subtracting a predetermined number from the continuous failure count of the search operation under the condition that the search operation fails to search for the first network by the terminal after the timer has elapsed, and re-performing the search operation for the first network.

19. The non-transitory storage medium according to claim 17, wherein the network search method further comprises:
   under the condition that the search operation fails to search for the first network by the terminal after the timer has elapsed, setting a fixed time length without adjusting the time length of the timer or increasing the time length of the timer in a predetermined manner.

20. The non-transitory storage medium according to claim 15, wherein the network search method further comprises:
   subtracting a predetermined number from the continuous failure count of the search operation under the condition that the initiated search operation based on the routing area updating request or the location area updating request, fails to search for the first network; and
   re-performing the search operation for the first network.

* * * * *